United States Patent [19]

Benazzi et al.

[11] Patent Number: 5,695,735
[45] Date of Patent: Dec. 9, 1997

[54] PROCESS FOR THE SYNTHESIS OF ZEOLITES AND MESOPOROUS SOLIDS FROM A HOMOGENEOUS SOLUTION IN A SEMI-OPEN SYSTEM

[75] Inventors: Eric Benazzi, Montesson; Pierre-Yves Legoff, Brunstatt; Philippe Caullet, Illzach; Jean-Louis Guth, Mulhouse, all of France

[73] Assignee: Institut Francais du Petrole, Rueil Malmaison cedex, France

[21] Appl. No.: 565,399

[22] Filed: Nov. 30, 1995

[30] Foreign Application Priority Data

Nov. 30, 1994 [FR] France .................. 94 14499

[51] Int. Cl.$^6$ .................. C01B 39/02; C01B 39/04
[52] U.S. Cl. .................. 423/700; 423/701; 423/702; 423/704; 423/709; 423/DIG. 21; 423/DIG. 22; 423/DIG. 27; 423/DIG. 32; 423/DIG. 38
[58] Field of Search .................. 423/700, 701, 423/702, 704, 705, 709

[56] References Cited

U.S. PATENT DOCUMENTS

| | | |
|---|---|---|
| 3,433,589 | 3/1969 | Ciric et al. . |
| 3,510,258 | 5/1970 | Hindin et al. .................. 423/700 |
| 3,808,326 | 4/1974 | McDaniel et al. .................. 423/709 |
| 4,112,056 | 9/1978 | Chen et al. .................. 423/705 |
| 4,521,297 | 6/1985 | Angevine et al. .................. 208/89 |
| 4,526,767 | 7/1985 | Robinson et al. .................. 423/702 |
| 5,110,570 | 5/1992 | Bellussi et al. .................. 423/705 |
| 5,246,688 | 9/1993 | Faust et al. .................. 423/704 |
| 5,296,208 | 3/1994 | Lesch .................. 423/700 |
| 5,389,358 | 2/1995 | Wu et al. .................. 423/718 |

FOREIGN PATENT DOCUMENTS

| | | |
|---|---|---|
| 0 131 898 | 1/1985 | European Pat. Off. . |
| 0 473 509 | 3/1992 | European Pat. Off. . |
| 2 666 321 | 3/1992 | France . |

*Primary Examiner*—Mark L. Bell
*Assistant Examiner*—David Sample
*Attorney, Agent, or Firm*—Millen, White, Zelano & Branigan, P.C.

[57] ABSTRACT

The invention concerns a process for the synthesis of zeolites based on element(s) T and mesoporous solids based on element(s) T, T being silicon and/or aluminium, comprising the following sequence of steps:

i) synthesizing a reaction medium which is a homogeneous source of element(s) T containing:

a) at least one source of element(s) T selected from the group formed by aqueous basic solutions of silica or silica and alumina and alcoholic solutions of alkyl tetraorthosilicate and trialkoxyaluminium;

b) optionally, at least one structuring agent;

c) optionally, seeds of the desired crystalline phase;

ii) heating the reaction medium to a temperature in the range 20° C. to 220° C. for a period in the range several minutes and several days;

iii) injecting at least one chemical agent at a controlled rate to generate polycondensable species in said medium.

17 Claims, No Drawings

PROCESS FOR THE SYNTHESIS OF ZEOLITES AND MESOPOROUS SOLIDS FROM A HOMOGENEOUS SOLUTION IN A SEMI-OPEN SYSTEM

BACKGROUND OF THE INVENTION

The present invention concerns a novel process for the synthesis of zeolites and mesoporous solids based on oxides of tetravalent elements. More precisely, the invention concerns a process for the synthesis of zeolites and mesoporous solids based on silicon and/or aluminium, of silicon and aluminium in the form of $TO_4$ tetrahedra, constituting the three-dimensional framework of these solids.

Zeolites are crystallized tectosilicates. They have a three-dimensional structure constructed from an assembly of $TO_4$ tetrahedra with their vertices in common, two different tetrahedra having only one oxygen in common. In aluminosilicate type zeolites, which are the most common, T represents tetravalent silicon as well as trivalent aluminium. The cavities and channels in the aluminosilicate framework, which are of molecular dimensions, attract cations which compensate the charge deficit associated with the presence of trivalent aluminium in the tetrahedra.

The chemical composition of zeolites containing elements Al and Si in their framework can be represented by the following approximate formula:

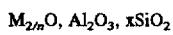

$$M_{2/n}O, Al_2O_3, xSiO_2$$

where:

M represents a cation with valency n, such as an alkali or alkaline-earth, or an organic cation;

x can vary, as a function of the structure of the zeolite, between two and infinity; if x is infinity, the zeolite is a microporous silica.

Each type of zeolite has a distinct porous structure. The variation between the dimensions and shapes of the pores of one type of zeolite compared with another generates different adsorbent and catalytic properties. Only molecules with certain dimensions and shapes can enter into the pores of a particular type of zeolite. The chemical composition, in particular the nature of the exchangeable compensating cations, is also an important factor in adsorption selectivity, and especially in the catalytic properties of these zeolites.

Because of their geometrical selectivity and cation exchange properties, zeolites are used in industry on a large scale both for adsorption (drying gases, separation of aromatic compounds, etc . . . ) and in catalysis (catalytic cracking, hydrocracking, isomerisation etc . . . ). There is currently no industrial application for ordered mesoporous solids (International patent application WO 91/11390 and Nature vol. 368, p 317, 24 March 1994). A number of patents illustrate the industrial applications of mesoporous solids, for example United States patents U.S. Pat. No. 5,105,051 and U.S. Pat. No. 5,134,241.

While numerous aluminosilicate type zeolites exist in nature, over the last few years research on substances with novel properties has led to the synthesis of a large variety of aluminosilicates with a zeolitic structure. Examples of a variety of structures which have been successfully synthesized are: Y zeolite (U.S. Pat. No. 3,130,007), ZSM-5 or MFI zeolite (U.S. Pat. No. 3,702,886), ZSM-12 zeolite (U.S. Pat. No. 3,832,449), and ZSM-22 (U.S. Pat. No. 4,481,177). More recently, ordered mesoporous solids have been synthesized, using organic structuring agents which are surfactants.

Zeolites are generally synthesized from a silica or silica and alumina gel, transformation of the gel to zeolite crystals being effected hydrothermally. The generally agreed synthesis mechanism is a dissolution-recrystallization mechanism. Crystal formation takes place in the liquid phase following condensation reactions between some of the silicate and aluminosilicate species present. The solid phase of the gel acts as a reservoir for reactants due to continuous dissolution. These reactions are possible because of the presence of mobilizing agents, generally $OH^-$, and also $F^-$ (synthesis in a basic medium or in a neutral or acidic medium respectively), which allow the transfer of polycondensable species by the solution. The reaction medium also contains "structuring" agents which are incorporated into the microporous space in the framework during crystallization, thus controlling the construction of the framework and contributing, via the reactions which occur, to the stability of the structure. These structuring agents may be inorganic or organic in nature.

Since zeolites are metastable compounds, the nature of the zeolite formed from a gel depends not only on conventional thermodynamic parameters (overall composition of the gel, temperature, pressure) but also on "kinetic" factors linked to the "reactivity" of the gel. This gel reactivity, which partially determines the degree of "supersaturation" achieved in the liquid phase, is a function of the method used to prepare the gel ("history" of the gel) or the nature of the starting materials used (the degree of division, for example).

This method of synthesis from a gel has a number of problems, among them:

- the difficulty of producing large quantities of gels which are homogeneous in texture and composition, with solubility properties which are spatially and temporally stable;

- generally non congruent (imperfect) dissolution of the gel, i.e., non-homogeneous temporally and spatially;

- chemical engineering problems associated with use and which involve difficulties with stirring the gel, which is sometimes very viscous and of complex control of heat transfers in the reaction system as a whole;

- a possible reduction in gel reactivity due to ageing during the heating period;

- supersaturation of the solution which is brought about by the composition and texture of the gel which cannot thus be genuinely controlled;

- as a consequence of the preceding point, the impossibility of controlling the nucleation and growth conditions of the zeolite crystals.

A further synthesis method consists of using homogeneous aqueous reaction mixtures in place of gels.

Several types of zeolite have been prepared by heating aqueous solutions of basic metastable aluminosilicates.

FAU type zeolites, for example, have been prepared using this method by S. Neda, N. Kageyama, M. Koizumi, Proc. 6th Int. Zeol. Conf., (Reno, USA, 1983) and A. Bisio and D. H. Olson, Eds., Butterworths, OK, 1984. Similarly, LTA type zeolite has been prepared using this method, by P. Wengin, S. Neda, M. Koizumi, Proc. 7th Int. Zeol. Conf. (Tokyo, Japan, 1986) and Y. Murakami, A. Jijima, J. W. Ward, Eds., Kodanska-Elsevier, Tokyo-Amsterdam, 1986.

MFI type zeolites based on silicon and element(s) T', selected from the group formed by Ti, Ge, Zr and Sn, have been prepared from a homogeneous reaction mixture containing a silicon source in the form of a fluorinated complex, one or more sources of tetravalent elements T' in the form of fluorinated complexes, a chemical modifying agent which provides $HO^-$ ions by hydrothermal decomposition under the reaction conditions, and a structuring agent which orientates and stabilizes the formation of the MFI type zeolite. Heating the reaction mixture comprising the chemical modifying agent at a temperature of at least 120° C. leads to the formation of a zeolite precipitate which is then separated out. This method is described in French patent applications No. 2,666,321, 2,674,516 and 2,674,517.

During syntheses in closed systems from the solutions mentioned above, it is clear that the supersaturation and thus the nucleation and growth conditions again cannot be controlled.

An aim of the present invention is thus to provide a novel process for the synthesis of zeolites based on element(s) T, i.e., based on silicon or based on silicon and aluminium, and mesoporous solids based on element(s) T, i.e., based on silicon and/or aluminium, which can overcome the problems described above.

This process, in contrast to prior known processes, is such that the starting mixtures are constituted by homogeneous aqueous solutions, the zeolite or mesoporous solid being synthesized in a semi-open system by controlled injection of a reactant.

More particularly, the present invention concerns a process for the synthesis of zeolites based on silicon or based on silicon and aluminium, the Si/Al molar ratio being in the range 1 to infinity (including these limits), and mesoporous solids based on silicon and/or aluminium, i.e., based on silicon or based on aluminium or based on silicon and aluminium, comprising the following sequence of steps:

i) synthesizing a homogeneous reaction medium as a source of element(s) T (silicon and/or aluminium) containing:

a) at least one source of element(s) T, T being selected from the group formed by silicon and aluminium, selected from the group formed by aqueous basic solutions and alcoholic solutions of an alkyl tetraorthosilicate and a trialkoxyaluminium;

b) optionally, at least one organic and/or inorganic structuring agent;

c) optionally, seeds of the desired crystalline phase;

ii) heating the reaction medium to a temperature in the range 20° C. to 220° C., preferably in the range of 20° C. to 180° C., for a period in the range of several minutes to several days, preferably in the range 10 minutes to 24 hours;

iii) injecting at least one chemical agent at a controlled rate to generate polycondensable species in said medium as they are used up, to ensure nucleation and growth of the crystals of zeolites or mesoporous solids.

Thus when zeolites based on element(s) T are synthesized, T is silicon or silicon and aluminium. When the process is used to synthesize mesoporous solids based on element(s) T, T is silicon or aluminium, or silicon and aluminium.

The synthesis process of the invention may optionally comprise a supplemental calcining step for the crystals obtained at step (iii), at a temperature of more than 400° C., to eliminate the structuring agent from the channels of the prepared structures.

The source of element(s) T (silicon or aluminium) is:
either a stable silica-based aqueous solution, and optionally a stable alumina-based aqueous solution, these two solutions being basic when mixed together. These aqueous solutions are well known to the skilled person and may be, by way of non limiting example, aqueous solutions of sodium silicates and sodium aluminate.

or an alcoholic solution of Si(OR)$_4$, silicon tetraorthosilicate, optionally with Al(OR)$_3$, a trialkoxyaluminium; these solutions are well known to the skilled person.

The source of element(s) T is in an entirely soluble form in the reaction medium in order to ensure homogeneity of the medium, which is then termed a homogeneous solution.

The structuring agent is selected from those known to the skilled person for syntheses of zeolites and mesoporous solids. It can be used alone or mixed with at least one other structuring agent. In the case of an inorganic structuring agent, for example, sodium can be used, also the fluoride ion F$^-$.

The polycondensable species are obtained from said homogeneous reaction medium by controlled injection of at least one chemical agent. The nature of the chemical agent depends on the nature of the source of element(s) T.

Thus: in the case where the source of element(s) T is a basic aqueous solution of silica or silica-alumina, the polycondensable species are produced by controlled injection of at least one chemical agent selected from the group formed by acids, alcohols, and ethers, for example methanol (MeOH) or ethanol (EtOH), and aqueous aluminate solutions and aqueous structuring agent solutions in the case, for example, where the structuring agent is not initially present in the reaction medium.

When the chemical agent is an acid, a pure acid or an aqueous acid solution is used. Examples are acetic acid, $CH_3CO_2H$, ammonium chloride $NH_4Cl$, or a gas such as $CO_2$. In this case, controlled injection of acid leads to a reduction in the pH of the solution and the formation of polycondensable species in accordance with the following reaction:

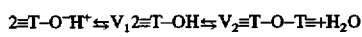

where T=Si, Al.

The control of the acid injection rate, and thus the rate of formation of the polycondensable species ($v_1$), allows the direct formation of crystals of zeolites or mesoporous solids from the solution without the intermediate formation of a gel. Controlling the supersaturation of polycondensable species allows the crystallisation rate to be controlled.

Thus: when the source of elements T is an alcoholic solution of Si(OR)$_4$ and/or Al(OR)$_3$, the polycondensable species are produced by controlled injection of at least one chemical agent selected from the group formed by water, aqueous acidic or basic solutions, compounds which decompose at the synthesis temperature to form water and aqueous solutions of the structuring agent in the case where, for example, the structuring agent is not initially present in the reaction medium.

In all cases, synthesis of the zeolite or mesoporous solid can be carried out with stirring (stirred mode) or in a static mode, stirring being particularly easy since a homogeneous reaction medium is present.

EXAMPLES

The following examples illustrate the invention without in any way limiting its scope.

EXAMPLE 1

1.2 grams of Aerosil 130 silica was dissolved in an aqueous sodium hydroxide solution (0.4 grams of sodium hydroxide and 7.2 grams of water). 0.532 grams of tetrapropylammonium bromide, TPABr, (Fluka) was then dissolved in 21.6 grams of water. The two solutions were then mixed. The molar composition of the solution was:

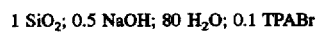

This solution was introduced into an autoclave lined with Teflon (capacity 125 cm$^3$) and heated to 170° C. Synthesis was carried out over 6 hours at 170° C. in stirred mode by injection of 15 cm³ of methanol (Merck) using a HPLC pump (flow rate 50 μl/min).

After cooling, the product was recovered by filtration then washed with distilled water and dried at 80° C. for 12 hours.

The initial pH and the final pH were respectively about 11.2 and 12. The X ray diffraction diagram was characteristic of an MFI type zeolite and is shown in Table 1. The mass obtained was 0.7 grams and the average crystal length was about 4 mm.

TABLE 1

| X ray diffraction diagram | |
|---|---|
| d (hkl) (Å) | I/Io |
| 11,08 | TF |
| 9,95 | F |
| 9,68 | mF |
| 8,91 | tf |
| 7,40 | m |
| 7,04 | f |
| 6,68 | f |
| 6,33 | m |
| 6,04 | m |
| 5,95 | m |
| 5,69 | mf |
| 5,54 | m |
| 4,43 | tf |
| 4,35 | mf |
| 4,24 | m |
| 3,99 | f |
| 3,83 | f |
| 3,81 | TF |
| 3,74 | mF |
| 3,70 | F |
| 3,64 | F |
| 3,431 | m |
| 3,335 | mf |
| 3,301 | mf |
| 3,045 | mf |
| 2,977 | mf |
| 2,939 | f |
| 2,856 | tf |
| 2,724 | tf |
| 2,603 | f |
| 2,485 | tf |
| 2,392 | tf |
| 2,005 | f |
| 1,992 | f |
| 1,871 | tf |

TF: very strong; F: strong; mF: less strong; m: average; mf: average–weak; f: weak; tf: very weak.
1 (Å) = 10⁻¹⁰ m.

EXAMPLE 2

1.2 grams of Aerosil 130 silica was dissolved in an aqueous sodium hydroxide solution (0.4 grams of sodium hydroxide and 7.2 grams of water). 0.07 grams of sodium aluminate, $NaAlO_2$ (Carlo Erba), was then dissolved in an aqueous sodium hydroxide solution (0.12 grams of sodium hydroxide and 7.2 grams of water). Finally, 0.532 grams of tetrapropylammonium bromide, TPABr, (Fluka) was dissolved in 14.4 grams of water. The three solutions were then mixed. The molar composition of the solution was:

1 $SiO_2$; 0.65 NaOH; 0.0427 $NaAlO_2$; 80 $H_2O$; 0.1 TPABr

This solution was introduced into an autoclave lined with Teflon (capacity 125·cm³) and heated to 170° C. Synthesis was carried out over 6 hours at 170° C. in stirred mode by injection of 9 cm³ of molar acetic acid using a HPLC pump (flow rate 25 μl/min).

After cooling, the product was recovered by filtration then washed with distilled water and dried at 80° C. for 12 hours.

The initial pH and the final pH were respectively about 12.1 and 11.4. The X ray diffraction diagram was characteristic of an MFI type zeolite and was very close to that shown in Table 1. The mass obtained was 1.17 grams; the Si/Al molar ratio was 25.

EXAMPLE 3

1.2 grams of Aerosil 130 silica was dissolved in an aqueous tetramethylamanonium hydroxide solution (25% in water, Aldrich) and potassium hydroxide (7.2 grams of tetramethylammonium hydroxide, 25% in water, 1.12 grams of potassium hydroxide and 9 grams of water). 0.0328 grams of sodium aluminate was then dissolved in this solution. The molar composition of the solution was:

1 $SiO_2$; 1 KOH; 1 TMAOH; 0.02 $NaAlO_2$; 80 $H_2O$;

This solution was introduced into an autoclave lined with Teflon (capacity 125 cm³) and heated to 170° C. Synthesis was carried out over 5 hours at 170° C. in stirred mode by injection of 15 cm³ of acetic acid (Fluka) using a HPLC pump (flow rate 50 μl/min).

After cooling, the product was recovered by filtration then washed with distilled water and dried at 80° C. for 12 hours.

The initial pH and the final pH were respectively about 14 and 12.1. The X ray diffraction diagram was characteristic of an OFF (offretite) type zeolite and is shown in Table 2. The mass obtained was 0.12 grams.

TABLE 2

| X ray diffraction diagram. | |
|---|---|
| d (hkl) (Å) | I/Io |
| 11,4 | TF |
| 7,50 | m |
| 6,58 | mF |
| 6,29 | mf |
| 5,71 | m |
| 4,55 | m |
| 4,32 | mF |
| 3,81 | mF |
| 3,75 | F |
| 3,581 | mF |
| 3,305 | m |
| 3,148 | m |
| 3,124 | f |
| 2,927 | f |
| 2,862 | mF |
| 2,843 | F |
| 2,677 | mf |
| 2,498 | mf |
| 2,480 | mf |
| 2,204 | f |
| 2,115 | f |
| 2,101 | f |
| 2,080 | tf |
| 1,889 | mf |
| 1,834 | f |

TF: very strong; F: strong; mF: less strong; m: average; mf: average–weak;. f: weak; tf: very weak.
1 (Å) = 10⁻¹⁰ m.

EXAMPLE 4

1.2 grams of Aerosil 130 silica was dissolved in an aqueous tetramethylammonium hydroxide solution (25% in water, Aldrich) (14.56 grams of tetramethylammonium hydroxide, 25% in water, and 3.46 grams of water). 0.027 grams of alumina (24.6% water) was then dissolved in this solution.

The molar composition of the solution was:

1 $SiO_2$; 2 TMAOH; 0.01 $Al_2O_3$; 80 $H_2O$;

This solution was introduced into an autoclave lined with Teflon (capacity 125 cm$^3$) and heated to 170° C. Synthesis was carried out over 44 hours at 170° C. in static mode by injection of 15 cm$^3$ of a molar ammonium chloride solution using a HPLC pump (flow rate 5.7 μl/min).

After cooling, the product was recovered by filtration then washed with distilled water and dried at 80° C. for 12 hours.

The initial pH and the final pH were respectively about 14 and 12.5. The X ray diffraction diagram was characteristic of a SOD type zeolite and is shown in Table 3. The mass obtained was 0.9 grams. The molar composition was as follows:

5 $SiO_2$; 1 $AlO_2^-$; 1 $TMA^+$.

TABLE 3

| X ray diffraction diagram. | |
|---|---|
| d (hkl) (Å) | I/Io |
| 6,29 | mF |
| 4,56 | F |
| 3,64 | TF |
| 3,161 | m |
| 2,827 | m |
| 2,581 | m |
| 2,234 | mf |
| 2,109 | f |
| 1,908 | f |

TF: very strong; F: strong; mF: less strong; m: average; mf: average-weak; f: weak; tf: very weak.
1 (Å) = $10^{-10}$ m.

EXAMPLE 5

1.2 grams of Aerosil 130 silica was dissolved in an aqueous sodium hydroxide solution (0.4 grams of sodium hydroxide, 7.2 grams of water). 28.8 grams of hexadecyltrimethylammonium chloride, CTMACl, (25% in water, Fluka) was added to this solution. The molar composition of the solution was:

1 $SiO_2$; 0.5 NaOH; 1.125 CTMACl; 80 $H_2O$;

At a temperature of 20° C., 15 cm$^3$ of a molar ammonium chloride solution was injected over three minutes (flow rate 5 ml/min).

The product was recovered by filtration then washed with distilled water and dried at 80° C. for 12 hours.

The initial pH and the final pH were respectively about 11.5 and 9.8. The X ray diffraction diagram was characteristic of a mesoporous MCM-41 type product; one intense diffraction peak corresponding to a d(hkl) of about 37 Å accompanied by several far less intense peaks at 21.4, 18.5 and 14 Å. The mass obtained was 1.3 grams.

EXAMPLE 6

A tetrapropylammonium silicate solution was prepared by dissolving 3 grams of Aerosil silica in 50 cm$^3$ of a molar aqueous solution of $Pr_4N^+OH^-$ (20% by weight of $Pr_4NOH$, Fluka). This solution, with a molar composition of 1 $SiO_2$; 1 $Pr_4NOH$; 45 $H_2O$, was transferred to an autoclave lined with Teflon (125 cm$^3$ capacity) then heated to 170° C. Synthesis was carried out over 24 hours by controlled and continuous injection of carbon dioxide (hourly flow rate 0.14 grams/hour) at 170° C. and in stirred mode (magnetic bar). After rapid cooling (the autoclave was plunged into cold water at 15° C.), the solid was filtered, washed with distilled water then dried at 80° C. for 24 hours.

The initial and final pHs were 13.5 and 12.8 respectively.

The diffraction diagram was analogous to that shown in Table 1 and was characteristic of an MFI type zeolite. The mass recovered was about 1 gram, the crystal size (length) was close to 8 mm.

EXAMPLE 7

A synthesis analogous to that of Example 6 was carried out, prolonging the injection period to 48 hours (the other operating conditions remained the same). This produced a MFI type zeolite (X ray diffraction diagram analogous to that of Table 1) with a mass of about 2.8 grams. The size (length) of the crystals obtained was about 15 mm, the final pH was about 10.3.

EXAMPLE 8

17.8 grams of Aerosil 130 silica was dissolved in a hot aqueous solution of 30.07 g of tetraethylammonium hydroxide (40% by weight TEAOH, purum). Meanwhile, 0.369 g of sodium aluminate ($NaAlO_2$, Carlo Erba) was dissolved at room temperature in a solution prepared by dissolving 0.4 g of sodium hydroxide in 13.1 g of water. The solution formed by mixing the two above solutions had the following molar composition:

26 $SiO_2$; 0.9 $NaAlO_2$; 2 NaOH; 18 TEAOH; 333 $H_2O$.

The pH was about 13.8.

This solution was introduced into an autoclave lined with Teflon (capacity 125 cm$^3$) and heated to 150° C. Synthesis was carried out over 22 hours at 150° C. in stirred mode by injection of 15 cm$^3$ of a molar aqueous acetic acid solution (Fluka) using a HPLC pump (flow rate about 11 μl/min). The final pH was 13.1.

1.37 g of product was recovered after filtering, washing, drying (at 80° C.) and rehydration. The X ray diffraction diagram was characteristic of a beta zeolite (Table 4). The Si/Al molar ratio, determined chemically, was about 9.

TABLE 4

| X ray diffraction diagram. | |
|---|---|
| d (hkl) (Å) | I/Io |
| 11,7 | mF |
| 4,15 | mF |
| 3,95 | TF |
| 3,52 | f |
| 3,32 | m |
| 3,02 | m |
| 2,07 | f |

TF: very strong; F: strong; mF: less strong; m: average; mf: average-weak; f: weak; tf: very weak.
1 (Å) = $10^{-10}$ m.

EXAMPLE 9

1.2 grams of Aerosil silica was dissolved in an aqueous sodium hydroxide solution (7.2 grams of water and 1.2 grams of sodium hydroxide). 0.07 grams of sodium aluminate ($NaAlO_2$, Carlo Erba) was dissolved in an aqueous solution constituted by 7.2 grams of water and 0.08 grams of sodium hydroxide. The two solutions were mixed and 14.4 grams of water was added. The final molar composition was:

1 $SiO_2$; 0.0422 $NaAlO_2$; 1.6 NaOH; 80 $H_2O$;

This solution was introduced into an autoclave lined with Teflon (capacity 125 cm$^3$), and 0.24 grams of NaY zeolite crystals (Si/Al=2.6) was added. The autoclave was heated to 100° C. Synthesis was carried out over three hours at 100° C. in stirred mode by injection of 15 cm³ of molar acetic acid (Fluka) using a HPLC pump (flow rate 83 µl/min).

After cooling, the product was recovered by filtration then washed with distilled water and dried at 80° C. for 12 hours. The initial pH was at least 14 and the final pH was 12.9. The X ray diffraction diagram was characteristic of an FAU type zeolite and is shown in Table 5.

The mass obtained was 0.41 grams. The Si/Al molar ratio was about 2.6.

TABLE 5

| X ray diffraction diagram | |
|---|---|
| d (hkl) (Å) | I/Io |
| 14,2 | TF |
| 8,71 | m |
| 7,43 | f |
| 5,65 | mF |
| 4,74 | mf |
| 4,35 | m |
| 3,76 | mF |
| 3,29 | m |
| 3,02 | f |
| 3,00 | f |
| 2,90 | mf |
| 2,84 | mF |
| 2,75 | f |
| 2,63 | f |

TF: very strong; F: strong; mF: less strong; m: average; mf: average–weak; f: weak; tf: very weak.
1 (Å) = $10^{-10}$ m.

EXAMPLE 10

1.2 grams of Aerosil 130 silica was dissolved in an aqueous sodium hydroxide solution (1.28 grams of sodium hydroxide and 7.2 grams of water). The molar composition of the solution was:

1 $SiO_2$; 1.6 NaOH; 80 $H_2O$;

0.24 grams of FAU type zeolite with a Si/Al ratio of 2.6 was introduced into 21.6 grams of water. The two solutions were then mixed.

This solution was introduced into an autoclave lined with Teflon® (capacity 125 cm³), and heated to 100° C. Synthesis was carried out over 5 hours at 100° C. in stirred mode by injection of 15 cm³ of aluminium sulphate with a concentration of 0.233 mole/l (Prolabo) using a HPLC pump (flow rate 50 µl/min).

After cooling, the product was recovered by filtration then washed with distilled water and dried at 80° C. for 12 hours.

The initial and final pHs were respectively about 14. The X ray diffraction diagram was characteristic of an FAU type zeolite. The mass obtained was 1.42 grams, and the Si/Al ratio was about 2.6.

We claim:

1. A process for the synthesis of zeolites based on silicon or based on silicon and aluminium, or mesoporous solids based on silicon or based on aluminium, or based on silicon and aluminium, comprising:

i) synthesizing a reaction medium as a source of at least one element(s) T, T being silicon or aluminium, said medium being an aqueous solution containing at least one source of at least one element(s) T which source is an aqueous basic solution or an alcoholic solution of an alkyl tetraorthosilicate or a trialkoxyaluminate;

ii) heating the reaction medium; and iii) injecting at least one chemical agent at a rate effective to generate polycondensable species in said medium, whereby upon injection of said agent, said species undergo crystallization to form a zeolite or mesoporous solid.

2. A process for the synthesis of zeolites or mesoporous solids according to claim 1, in which the reaction medium further comprises at least one structuring agent.

3. A process for the synthesis of zeolites or mesoporous solids according to claim 1 in which the reaction medium further comprises seeds of zeolite or mesoporous solid.

4. A synthesis process according to claim 1, further comprising filtering the solution obtained from (iii) and calcining crystals obtained after filtration, at a temperature of more than 400° C.

5. A synthesis process according to claim 1, in which the source of element(s) T is a basic aqueous silica-based or alumina-based solution or a solution based on silica and alumina.

6. A process according to claim 5, in which the chemical agent is an acid, an alcohol, an aqueous aluminate solution or an aqueous solution of a structuring agent when the structuring agent is not initially present in the reaction medium.

7. A process according to claim 1, in which the source of element(s) T is an alcoholic solution of alkyl tetraorthosilicate Si(OR)$_4$, and optionally of trialkoxyaluminate Al(OR)$_3$, wherein R is an alkyl moiety.

8. A process according to claim 7, in which the chemical agent is water, a compound which decomposes at the synthesis temperature to the form water, or an aqueous solution of a structuring agent when the structuring agent is not initially present in the reaction medium.

9. A process according to claim 1, wherein in (ii), the reaction medium is heated to 20°–220° C. for 3 minutes to 44 hours.

10. A process according to claim 1, wherein in (ii), the reaction medium is heated to 20°–100° C. for 10 minutes to 24 hours.

11. A process according to claim 1, wherein the chemical agent is injected during heating.

12. A process according to claim 7, wherein R is $C_{1-10}$-alkyl.

13. A process according to claim 1, wherein the chemical agent is an acid, an alcohol, an ether, a base, water, a compound which decomposes to form water under reaction conditions, or an aqueous aluminate solution.

14. A process according to claim 13, wherein the chemical agent is acetic acid, ammonium chloride, $CO_2$, methanol, ethanol, or aluminium sulfate.

15. A process for the synthesis of zeolites based on silicon or based on silicon and aluminium, or mesoporous solids based on silicon or based on aluminium, or based on silicon and aluminium, comprising injecting, into an aqueous solution comprising at least one of an aqueous basic solution or an alcoholic solution of an alkyl tetraorthosilicate or a trialkoxyaluminate, at least one chemical agent at a rate effective to generate polycondensable species in said medium, wherein upon injection of said chemical agent, said species undergo crystallization to form a zeolite or mesoporous solid.

16. A process according to claim 15, wherein the chemical agent is an acid, an alcohol, an ether, a base, water, a compound which decomposes to form water under reaction conditions, an aqueous aluminate solution or an aqueous structuring agent solution when the structuring agent is not initially present in the aqueous solution.

17. A process according to claim 16, wherein the chemical agent is acetic acid, ammonium chloride, $CO_2$, methanol, ethanol, or aluminium sulfate.

* * * * *